United States Patent [19]
Patton

[11] 4,223,415
[45] Sep. 23, 1980

[54] WATERBORNE LIFE-SAVING APPARATUS

[76] Inventor: James J. Patton, Box 426, Phillipsburg, Kans. 67661

[21] Appl. No.: 74,931

[22] Filed: Sep. 13, 1979

[51] Int. Cl.$^3$ .............................................. B63C 9/00
[52] U.S. Cl. ........................................... 9/14; 9/11 A
[58] Field of Search ................ 9/14, 11 R, 11 A, 311, 9/33 D; 244/142, 146

[56] References Cited

U.S. PATENT DOCUMENTS

| | | | |
|---|---|---|---|
| 2,384,721 | 9/1945 | Bingham, Jr. | 244/142 |
| 2,928,108 | 3/1960 | Cochrane et al. | 244/146 |
| 3,477,074 | 11/1969 | Bezanis | 9/311 |
| 3,768,761 | 10/1973 | Cramer | 9/11 A |
| 3,986,220 | 10/1976 | Johnson | 9/311 |

FOREIGN PATENT DOCUMENTS 403564   4/1943   Italy ......................................... 244/142

Primary Examiner—Trygve M. Blix
Assistant Examiner—Jesus D. Sotelo
Attorney, Agent, or Firm—Henderson & Sturm

[57] ABSTRACT

An apparatus according to the above title comprising a buoyant raft spacedly surrounded by and connected to a buoyant ring from the periphery of which depends a water-containable bag forming a shark screen about the raft, and additionally such raft in which the water-containable bag is formed by the canopy of a parachute in which the raft is packed, the periphery of the canopy containing inflatable element connected to the raft and, when inflated, forming the surrounding buoyant ring.

10 Claims, 5 Drawing Figures

WATERBORNE LIFE-SAVING APPARATUS

BRIEF SUMMARY OF THE INVENTION

The prior art is replete with disclosures of life rafts assembled into parachutes for use by the pilot after bailing out, but in each instance the parachute per se is jettisoned upon alighting upon the body of water, and thus forms no part of the final raft. See, for example, U.S. Pat. Nos. 2,467,037 and 3,768,761. There exists also at least one prior patent (U.S. Pat. No. 3,986,220) disclosing the use of a buoyant annulus from the periphery of which depends a water-containable bag forming a shark screen about the occupant of the bag. In this instance, the occupant wears a life vest and occupies an upright position within the enclosure, which is but large enough to contain an adult person. Thus, the film material of which the bag is constructed in only a few inches from the occupant's body. The last-named patent also explains the theory of the screen as a shark deterrent because it (the screen) encloses blood (as from a wound), human excrement, etc. and thus will not attract sharks.

According to the present invention, vast improvements have been made over this prior art. For example, when the invention is considered in its parachute-related aspect, the canopy of the parachute is utilized as the water-containable bag, being supportingly connected to the raft and operative to encircle the raft upon descent of the apparatus onto a body of water. Further, the peripheral edge of the canopy has secured thereto inflatable means which, when inflated after alighting upon the body of water, furnishes buoyancy to the water-filled canopy. The canopy remains connected to the raft to form a unitary assembly. Moreover, the supporting means is also inflatable, further adding to the buoyancy of the unit. Means is provided on the raft for inflating the raft and for inflating the peripheral means and the inflatable support means. Apart from its parachute-related aspect, the novel raft may be used aboard ships by replacing the canopy with an equivalent structure which functions as a water-containable bag when thrown overboard. Depending upon the time available, inflation may be accomplished before or after the apparatus is water-borne. Other features will occur to those versed in the art as a preferred embodiment is disclosed in detail in the ensuing description and accompanying sheets of drawings.

DETAILED DESCRIPTION OF THE INVENTION

Figure 5:
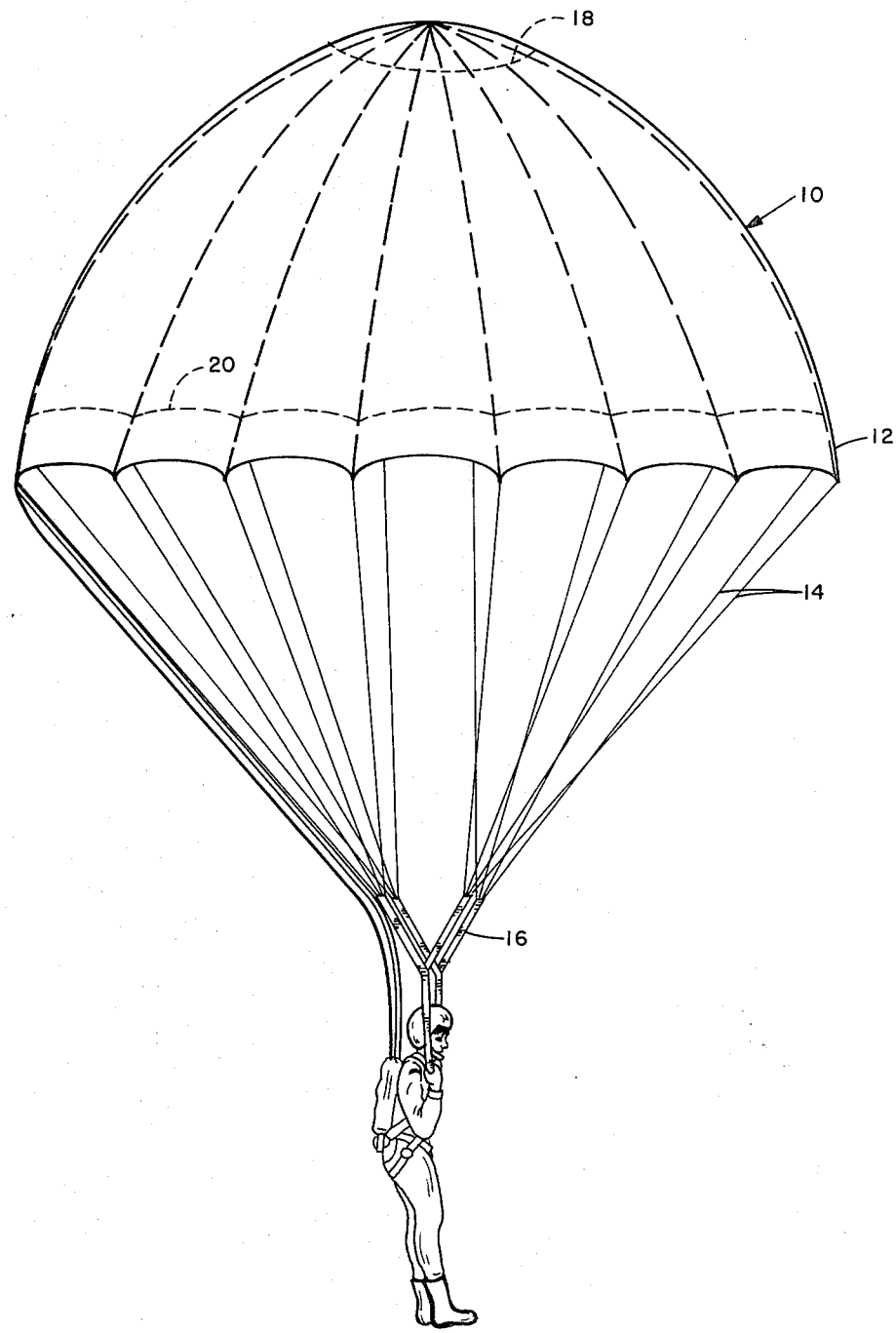
FIG. 5 is an elevation showing the apparatus as seen in descent and prior to alighting upon the body of water.

Reference will be had first to FIG. 5 for a general explanation of what is involved. A parachute 10 has a typical canopy 12 connected in any suitable manner at 14 to conventional parachute harness 16 supporting a pilot or other occupant departing from or ditching the airplane. Packed within the parachute canopy is a buoyant life raft 18 of any suitable construction. The raft shown here is inflatable. The manner of how it is packed into the parachute per se forms no part of the invention and thus these details are omitted. There is, however, a significant and novel feature of the relationship of the raft to the canopy as related to their functioning as a unit when the apparatus is water-borne or partly water-borne, which will be explained below.

Figure 1:
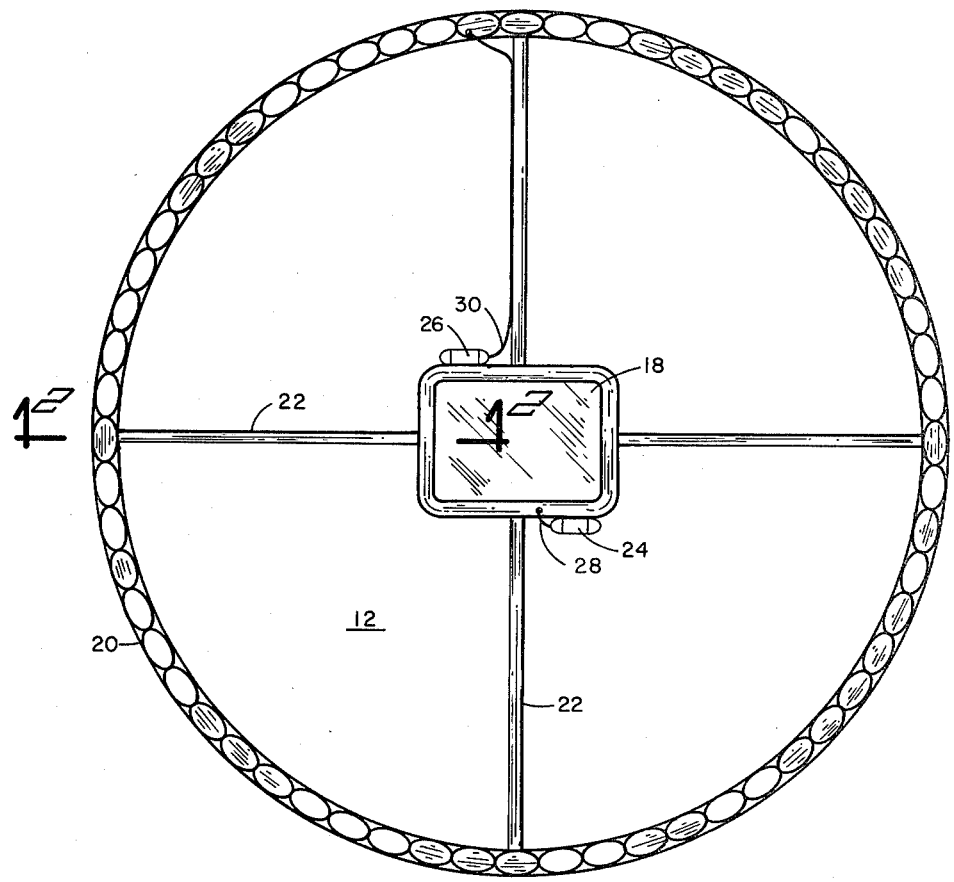
FIG. 1 is a plan of the apparatus as it appears after inflation and while water-borne.
Figure 2:
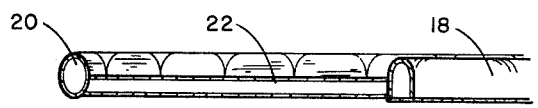
FIG. 2 is a section on the line 2—2 of FIG. 1.

As seen in FIG. 1, wherein the apparatus is completely inflated and water-borne, the raft is spacedly surrounded by or is in the substantial center of a buoyant ring 20. The ring is supportingly connected to the raft by means including a plurality of angularly spaced apart elements or spokes 22. The buoyancy of the ring is achieved because the ring is hollow and inflatable, and the spokes are also inflatable to achieve buoyancy. The ring and spokes may be constructed of any known material such as that used in inflatable structures; e.g., life rafts. The ring comprises inflatable means secured to the canopy 12 at its periphery, preferably completely about the peripheral edge of the canopy. Obviously, the ring is not inflated, nor are the raft or spokes, while packed in the parachute. The inflating means, of which there are preferably two, are carried by the raft and are shown at 24 and 26, the former being connected by conduit means 28 to the raft and the latter connected by conduit means 30 to the raft-spoke unit, the spokes being fluid-connected to the ring so as to inflate at about the same time (FIG. 2). The inflating means may be any suitable compressed air tanks or equivalent.

Figure 3:
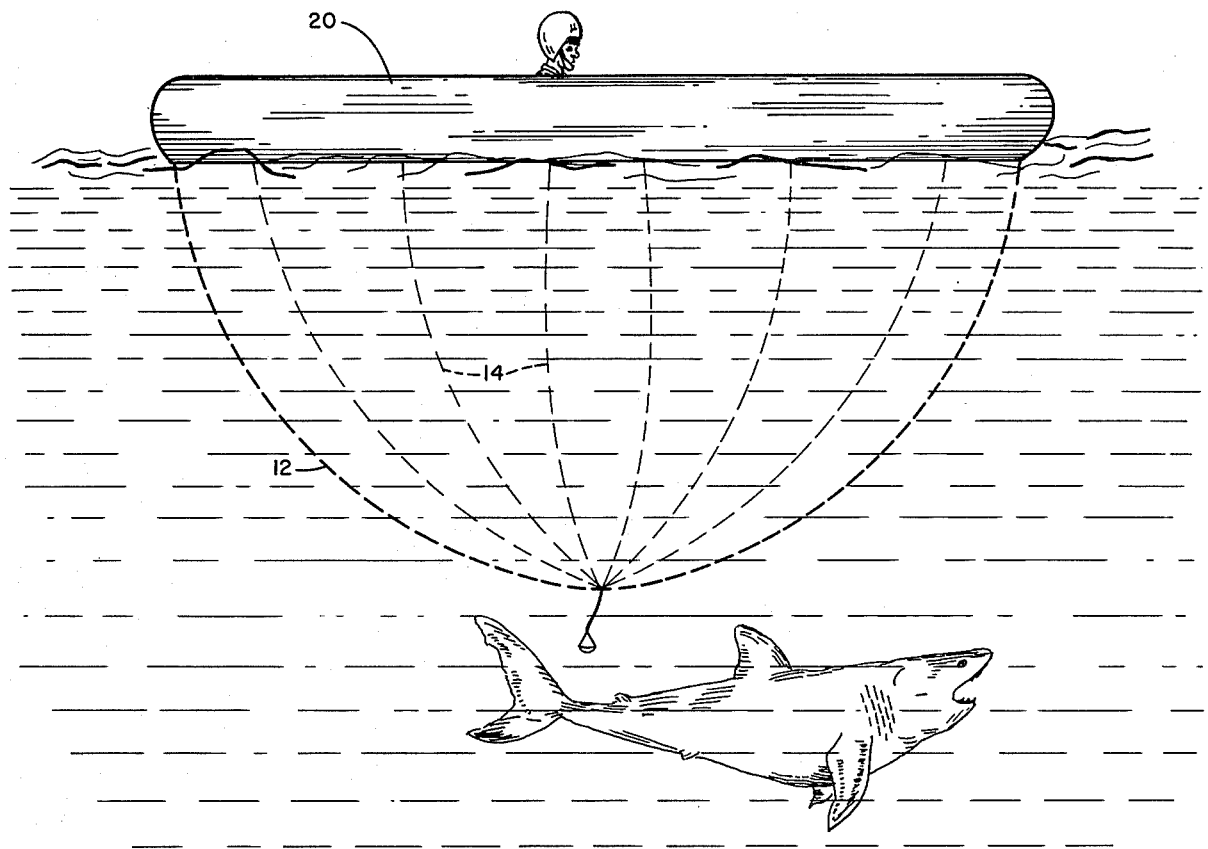
FIG. 3 is an elevation of the apparatus as seen in FIG. 1.
Figure 4:
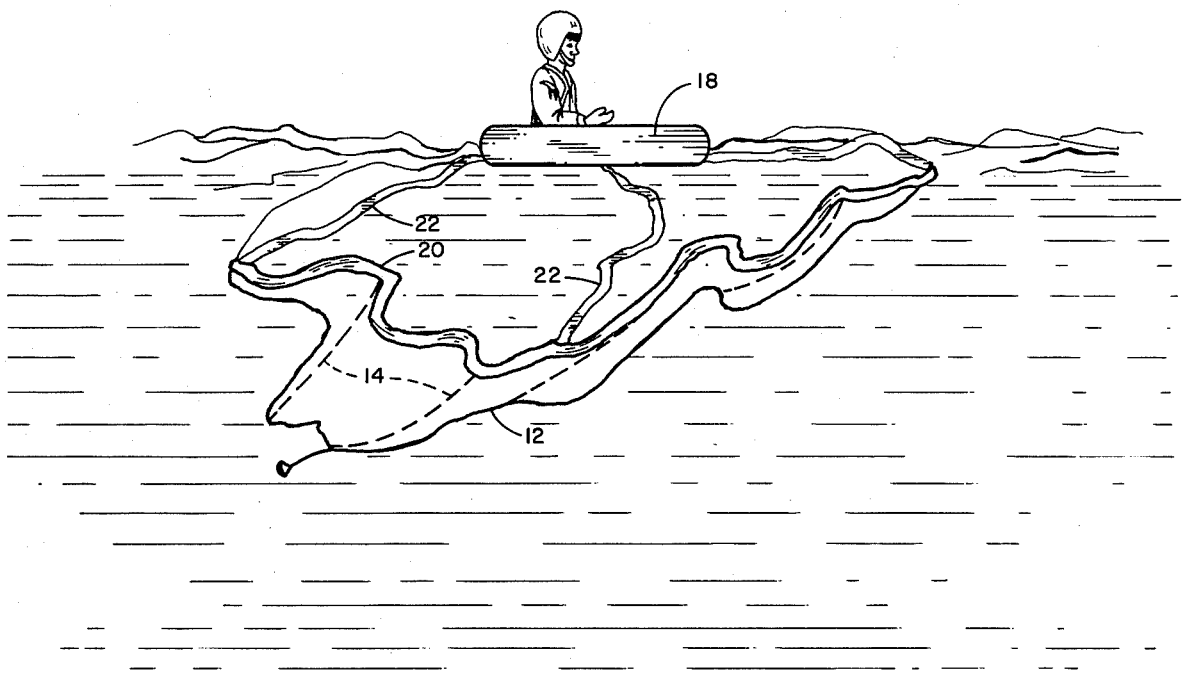
FIG. 4 is an elevation of the apparatus after the raft has been inflated and just before the inflatable ring is inflated.

Upon alighting upon the body of water, the airman or other occupant of the parachute quickly inflates the raft via the means 24 and climbs aboard the raft after inverting the raft so that the canopy is disposed below the raft, the cords 14, etc. being easily manipulated so as to fall within the canopy as seen in FIG. 4. He then activates the inflating means 26 to inflate the ring and spokes, the canopy then functioning as a water-containing bag (FIG. 3) to form an enclosed pool of water about and below the raft. As explained previously in connection with discussion of the above-cited U.S. Pat. No. 3,986,220, an effective shark screen is thus provided. The spokes are of equal length and keep the raft centered within the ring 20. As further features, the outside of the canopy may be colored blue, somewhat darker than water, and the raft, ring and spokes may be colored bright orange for high visibility. The inside of the canopy may be colored light blue. Thus the ring, raft and spokes may afford a visible target for rescuers.

As will be seen, the structure is light in weight and may be easily packed in a parachute. It may be used, as stated above, aboard ship, a suitable bag being substituted for the canopy. The apparatus is simple and easy to use, may be quickly inflated for use and deflated for storage or re-packing, and is capable of ready mass-production by use of known materials.

I claim:

1. A water-borne life-saving apparatus, comprising: a raft having a bottom and a buoyant, peripheral wall secured to and rising from said bottom; a buoyant, horizontally oriented peripheral member spacedly surrounding the raft; a plurality of elements spaced about and secured to the raft and extending horizontally outwardly from the raft to and secured to the peripheral member to maintain the spaced relation between the raft and member and to add to the buoyancy of the raft; and a water-containable bag closed at its bottom and sides and having its top peripheral edge secured to the peripheral member, said bag descending from the peripheral member and forming a water-containing shark screen around and below the raft.

2. The apparatus of claim 1, in which the peripheral wall of the raft is inflatable to furnish the buoyancy.

3. The apparatus of claim 1, in which the peripheral member is inflatable to furnish the buoyancy.

4. The apparatus of claim 1, in which at least one of the elements is inflatable to increase the buoyancy of the apparatus.

5. The apparatus of claim 1, in which both the peripheral wall of the raft and the peripheral member are inflatable to furnish the buoyancy.

6. The apparatus of claim 5, in which at least one of the elements is also inflatable.

7. The apparatus of claim 6, including means on the raft for inflating the wall, the member and said at least one of the elements.

8. The apparatus of claim 6, including a pair of means on the raft, one for inflating the peripheral wall and the other for inflating the peripheral member and said at least one of the elements, the member and said at least one of said elements having a fluid-transfer interconnection.

9. The apparatus of claim 1, in which the peripheral wall of the raft and the peripheral member are inflatable to furnish the buoyancy of the apparatus, and a pair of inflating means is carried by the raft, one for inflating the peripheral wall and the other for inflating the peripheral member.

10. The apparatus of claim 1, in which the apparatus is part of a parachute and the bag is the canopy of the parachute, and the peripheral wall, the peripheral member and the elements are all connected to the canopy and are all inflatable to furnish the buoyancy of the apparatus.

* * * * *